United States Patent
Chen et al.

(10) Patent No.: US 8,897,573 B2
(45) Date of Patent: *Nov. 25, 2014

(54) VIRTUAL MACHINE IMAGE ACCESS DE-DUPLICATION

(75) Inventors: Han Chen, White Plains, NY (US); Alexei A. Karve, Mohegan Lake, NY (US); Minkyong Kim, Scarsdale, NY (US); Andrzej P. Kochut, Croton on Hudson, NY (US); Hui Lei, Scarsdale, NY (US); Jayaram Kallapalayam Radhakrishnan, Raleigh, NC (US); Zhiming Shen, Raleigh, NC (US); Zhe Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/588,173

(22) Filed: Aug. 17, 2012

(65) Prior Publication Data

US 2014/0052698 A1 Feb. 20, 2014

Related U.S. Application Data

(63) Continuation of application No. 13/588,050, filed on Aug. 17, 2012.

(51) Int. Cl.
*G06K 9/66* (2006.01)
(52) U.S. Cl.
USPC ........... 382/195; 711/206; 711/200; 711/202; 711/203; 711/205; 711/103
(58) Field of Classification Search
CPC ................................. G06K 9/4633; G06T 1/60

USPC .......... 382/195; 711/206, 200, 202, 203, 205, 711/103

See application file for complete search history.

(56) References Cited

U.S. PATENT DOCUMENTS

| | | |
|---|---|---|
| 6,789,156 B1 | 9/2004 | Waldspurger |
| 7,761,664 B2 | 7/2010 | Gill |
| 7,856,439 B2 | 12/2010 | Alpern et al. |
| 8,074,047 B2 * | 12/2011 | Abali et al. .................... 711/206 |
| 2008/0307188 A1 | 12/2008 | Franaszek et al. |
| 2010/0088349 A1 | 4/2010 | Parab |
| 2010/0131480 A1 | 5/2010 | Schneider |
| 2012/0066677 A1 | 3/2012 | Tang |
| 2012/0144099 A1 * | 6/2012 | Yang et al. .................... 711/103 |

OTHER PUBLICATIONS

Jayaram et al., An Empirical Analysis of Similarity in Virtual Machine Images, Middleware 2011 Industry Track, Dec. 12, 2011.
Copy-on-Write, Wikipedia, http://en.wikipedia.org/wiki/Copy-on-write downloaded Aug. 17, 2012.

* cited by examiner

*Primary Examiner* — Mike Rahmjoo
(74) *Attorney, Agent, or Firm* — Ryan, Mason & Lewis, LLP

(57) ABSTRACT

A system and an article of manufacture for de-duplicating virtual machine image accesses include identifying one or more identical blocks in two or more images in a virtual machine image repository, generating a block map for mapping different blocks with identical content into a same block, deploying a virtual machine image by reconstituting an image from the block map and fetching any unique blocks remotely on-demand, and de-duplicating virtual machine image accesses by storing the deployed virtual machine image in a local disk cache.

20 Claims, 3 Drawing Sheets

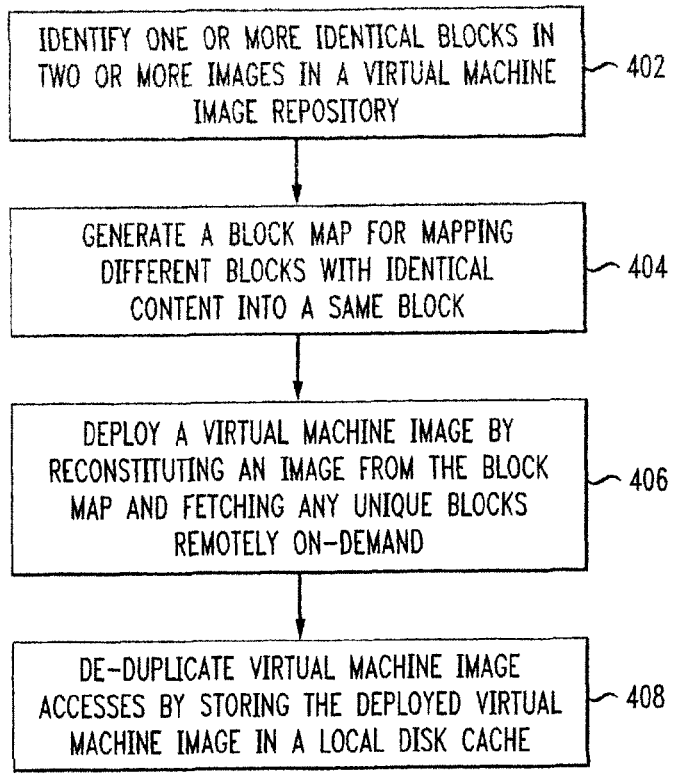
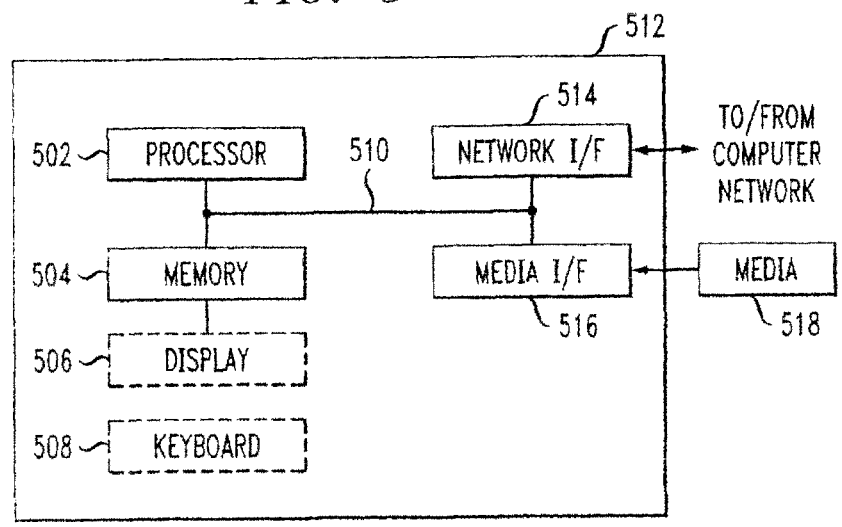

VIRTUAL MACHINE IMAGE ACCESS DE-DUPLICATION

CROSS-REFERENCE TO RELATED APPLICATIONS

This application is a continuation of U.S. patent application Ser. No. 13/588,050, filed Aug. 17, 2012, and incorporated by reference herein.

FIELD OF THE INVENTION

Embodiments of the invention generally relate to information technology, and, more particularly, to caching for virtual machine (VM) images.

BACKGROUND

Challenges exist in the de-duplication of virtual machine (VM) images. Input/output (I/O) contention occurs when accessing VM images, and managing such contention can be important for application performance, user experience, infrastructure cost, etc. However, challenges can arise due to, for example, a high density virtualized environment, a large number of VM images, and/or limited resources (memory and disk space) for caching images locally on compute nodes.

Different VM images often have common portions of data. Reasons for similarity can include, for example, similar operating systems, similar applications, and/or the fact that many new images are created by slightly modifying existing images. Accordingly, VM image access de-duplication aims to avoid I/O operations on blocks with identical content.

Existing approaches include on-demand streaming of a VM image, which includes copy-on-read (CoR), copy-on-write (CoW), and adaptive pre-fetching. Such approaches, however, do not exploit image similarity. Existing approaches can also include the use of a de-duplicated VM image repository. Such approaches attempt to exploit image similarity to combat image sprawl, but lack run-time support (that is, retrieving an image requires reconstituting and copying the entire image).

Other approaches include a general de-duplicated file system, which attempts to exploit file content similarity to reduce disk space occupation, but requires replacing existing file systems. Also, such approaches only consider de-duplicating block allocation instead of file access. Additionally, existing approaches can include VM memory page/cache sharing. Such approaches attempt to discover and share identical memory pages by content scanning or exchanging page information, but introduce high overhead costs.

SUMMARY

In one aspect of the present invention, techniques for virtual machine image access de-duplication are provided. An exemplary computer-implemented method for de-duplicating virtual machine image accesses can include steps of identifying one or more identical blocks in two or more images in a virtual machine image repository, generating a block map for mapping different blocks with identical content into a same block, deploying a virtual machine image by reconstituting an image from the block map and fetching any unique blocks remotely on-demand, and de-duplicating virtual machine image accesses by storing the deployed virtual machine image in a local disk cache.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a flow diagram illustrating techniques for de-duplicating virtual machine image accesses, according to an embodiment of the invention; and FIG. 5 is a system diagram of an exemplary computer system on which at least one embodiment of the invention can be implemented.

DETAILED DESCRIPTION

As described herein, an aspect of the present invention includes content-aware caching for virtual machine images. As noted above, challenges exist in efficient de-duplication of virtual machine images. Existing approaches are based on fixed or variable size chunks, which require significant changes to existing operating systems. Aspects of the invention, as detailed herein, are based on pair-wise similarity between virtual machine images.

At least one embodiment of the invention includes redirecting I/O accesses to an image A to another image B which is available in a memory or local disk cache. Meanwhile, the underlying storage of virtual machine images is in the original format. Accordingly, aspects of the invention include virtual machine image access de-duplication.

As described herein, many accesses to a local disk and/or remote VM repository are for blocks with identical content. One technique for identifying or determining block content includes comparing two or more blocks bit by bit. Another technique includes calculating the hash value of each block and combining all blocks with the same hash value. Accordingly, VM image accesses can be de-duplicated by sharing cache. At least one embodiment of the invention includes translating accesses to different blocks with the same content into accesses to the same blocks. After detecting that a first block and a second block have the same content, upon receipt of a request for the first block, at least one embodiment of the invention includes redirecting the request to the second block.

Additionally, an image can be logically constructed from existing images without data transfer. Using the redirection described above, at least one embodiment of the invention includes redirecting requests to blocks of image_x to other images residing on the computer, without transferring all blocks of image_x from the storage server.

Further, aspects of the invention also include on-demand fetching of requested blocks, and disk caching for saving network bandwidth usage. The requested blocks are fetched from the storage server, which is connected via a network to the compute node. After being fetched from the storage server, some data blocks (belonging to some images) are cached on the hard disk of the compute node. Accordingly, when those blocks are requested again by a VM, the requests can be served from the local compute node disk instead of having to transfer from the storage server. As a result, network bandwidth is saved.

Figure 1:
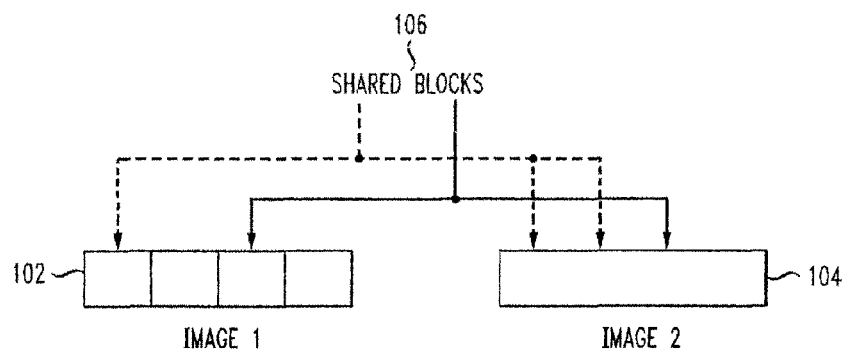
FIG. 1 is a diagram illustrating the concept of discovering identical blocks, according to an embodiment of the present invention.

FIG. 1 is a diagram illustrating the concept of discovering identical blocks, according to an embodiment of the present invention. By way of illustration, FIG. 1 depicts image 1 (102), image 2 (104) and shared blocks 106 discovered, for example, via hashing.

Figure 2:
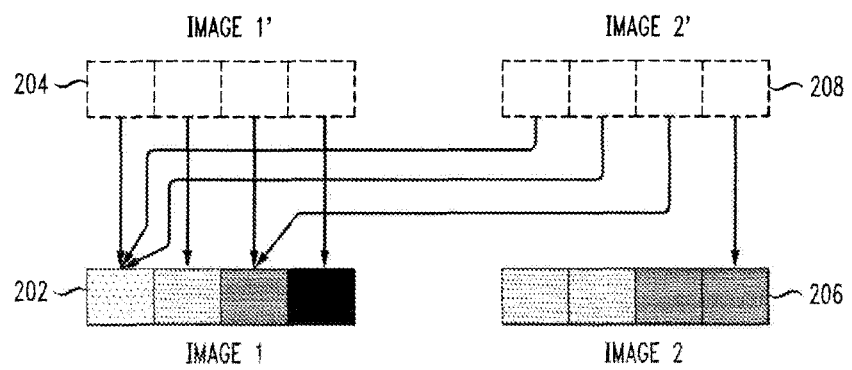
FIG. 2 is a diagram illustrating the concept of image access de-duplication, according to an embodiment of the present invention.

FIG. 2 is a diagram illustrating the concept of image access de-duplication, according to an embodiment of the present invention. By way of illustration, FIG. 2 depicts image 1 (202), image 1' (204), image 2 (206) and image 2' (208). The depiction of FIG. 2 corresponds to the translating step detailed herein. For example, requests to the $1^{st}$ and $2^{nd}$ blocks of image 2 (206) are translated to the $1^{st}$ block of image 1 (202). The "prime" indications here refer to conceptual images; that is, the image appears to the VM as a real image, but does not contain real data blocks.

Image access de-duplication such as depicted in FIG. 2 provides advantages over using raw images. For example, performance can be improved by sharing cache among VMs accessing blocks with the same content. Additionally, resource utilization can be made more efficient by saving memory and network bandwidth. Also, image access de-duplication such as depicted in FIG. 2 provides advantages over using de-duplicated file systems. For example, at least one embodiment of the invention offers an ease of deployment, and can work with an unmodified file system and VM repository. Additionally, image access de-duplication preserves storage layout, and is friendlier to sequential reads.

Figure 3:
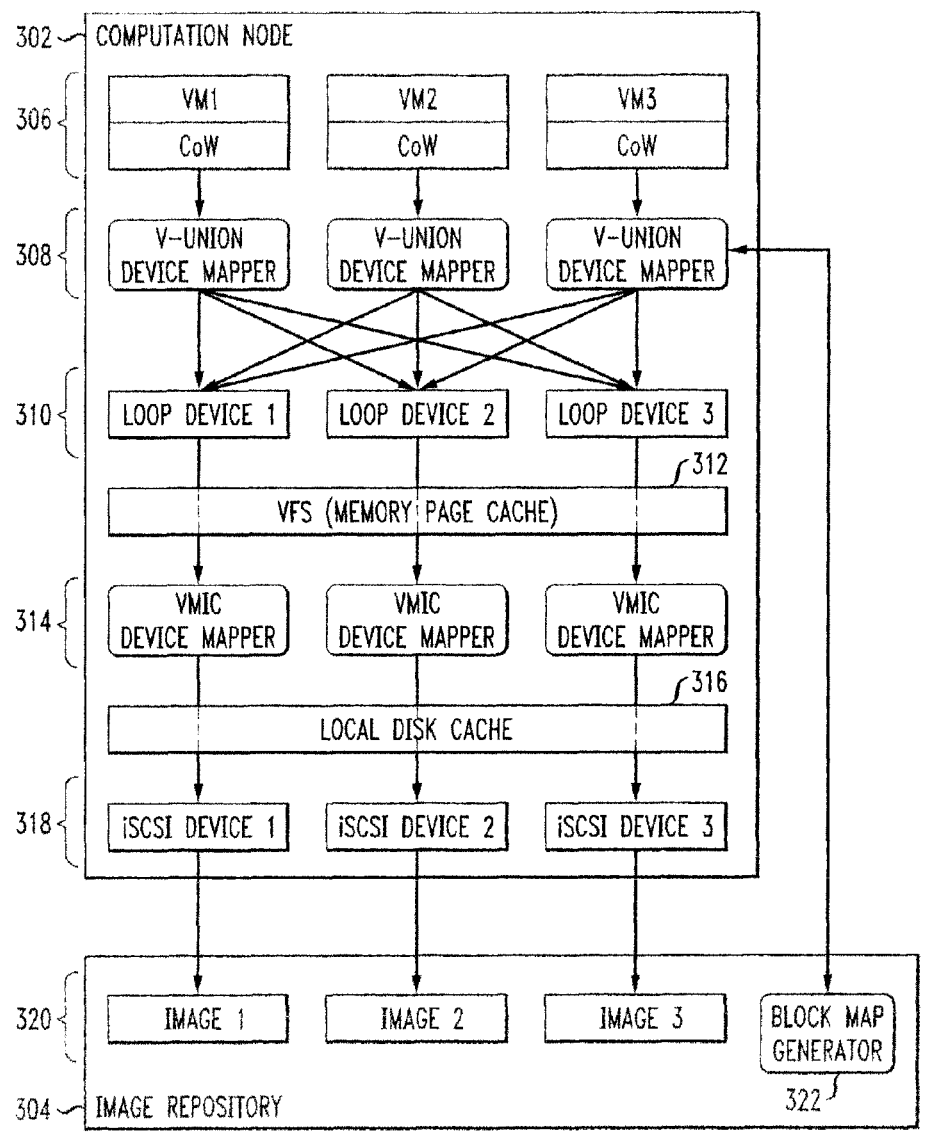
FIG. 3 is a block diagram illustrating an example embodiment, according to an aspect of the invention.

FIG. 3 is a block diagram illustrating an example embodiment, according to an aspect of the invention. By way of illustration, FIG. 3 depicts a computation node 302 and an image repository 304. Computation node 302 includes virtual machines 306 with copy-on-write portions, V-union device mapper components 308, loop devices 310, a virtual file system (VFS) (memory page cache) 312, virtual memory integrated cloud (VMIC) device mapper components 314 (that is, a disk cache as described herein), a local disk cache 316 and Internet small computer system interface (iSCSI) devices 318. Additionally, image repository 304 includes images 320 and a block map generator component 322.

As depicted in FIG. 3, each arrow represents a request between components. VMs 1-3 are different VMs running on the same computer. CoW denotes the copy-on-write files supporting the VMs. Copy-on-write is a technology to create snapshot files to store "dirty" data and avoid modifying the image file itself. Each CoW file will handle requests to "dirty" data of a VM. Therefore, all requests to "clean" data will bypass the CoW file, and go to the V-union device mapper 308. The V-union device mapper will redirect the requests according to the pre-calculated mapping rules (for example, the V-union device mapper for VM1 has arrows to the loop devices for VM2 and VM3).

The loop device 310 underneath each VM is a way to present a device interface from a regular file. The loop device will forward the received (redirected) requests to the OS VFS layer. This action will go through memory page cache 312. Additionally, the requests will be forwarded to VMIC devices 314. Each VMIC device is a disk cache corresponding to a VM image, and temporarily stores some VM image data on the local disk to avoid frequent accesses to remote storage repository. If a block of data is not found in the local disk cache 316, the request is forwarded to the storage repository 304 through the iSCSI protocol.

FIG. 4 is a flow diagram illustrating techniques for de-duplicating virtual machine image accesses, according to an embodiment of the invention. Step 402 includes identifying one or more identical blocks in two or more images in a virtual machine image repository.

Step 404 includes generating a block map for mapping different blocks with identical content into a same block. Generating a block map can include generating a block map when a file is created at any set of storage computers. The block map can additionally be consolidated by merging continuous blocks, and the block map can also be propagated to one or more cache devices (for example, an operating system page cache and/or a local disk cache).

In at least one embodiment of the invention, each entry in the block map points a set of file blocks to a set of destination addresses based on content of the set of file blocks. The destination addresses in the block map can be in the form of file blocks and include a file identifier (for example, a node number) and an offset. At least one embodiment of the invention can additionally include redirecting a read request to a set of destination addresses based on the block map upon receiving the read request for a set of file blocks at any cache device.

Step 406 includes deploying a virtual machine image by reconstituting an image from the block map and fetching any unique blocks remotely on-demand. Step 408 includes de-duplicating virtual machine image accesses by storing the deployed virtual machine image in a local disk cache. At least one embodiment of the invention can also include managing the local disk cache. Managing the local disk cache can include, for example, affording file blocks appearing in early positions in the cache higher priority to stay in the cache.

Further, at least one embodiment of the invention includes redirecting a read request to a set of destination addresses based on the block map upon receiving the read request for a set of blocks at any cache device. The techniques depicted in FIG. 4 can additionally include providing run-time support by redirecting image accesses to different base images. Further, at least one embodiment of the invention includes expediting look-up operations via a binary search, a bloom filter, etc.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor.

By way of example, in at least one embodiment of the invention, distinct software modules can include a metadata module, an access mapping module and a local disk cache management module. In such an example embodiment, the metadata module identifies one or more identical blocks in two or more images in a virtual machine image repository and generates a block map for mapping different blocks with identical content into a same block. Additionally, the access mapping module redirects virtual machine image accesses according to the block map, and the local disk cache management module fetches blocks remotely on-demand and stores virtual machine images in a local disk cache.

Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with to computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, sharing a cache among VM accessing blocks with the same content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a computer readable storage memory device having computer readable instructions tangibly embodied thereon which, when implemented, cause a computer to carry out a plurality of method steps comprising:
   identifying two or more blocks having identical content in two or more images in a virtual machine image repository;
   generating a block map for mapping the two or more blocks having identical content into a same block, wherein each entry in the block map points one of the two or more blocks to a destination address in a local disk cache associated with one or more blocks based on block content;
   deploying a virtual machine image by reconstituting an image from the block map and fetching any unique blocks remotely on-demand;
   de-duplicating virtual machine image accesses by storing the deployed virtual machine image in the local disk cache; and
   redirecting a read request for one of the two or more blocks to the corresponding destination address in a local disk cache based on the block map upon receiving the read request at a cache device.

2. The article of manufacture of claim 1, wherein the method steps comprise consolidating the block map by merging continuous blocks.

3. The article of manufacture of claim 1, wherein generating a block map comprises generating a block map when a file is created at any set of storage computers.

4. The article of manufacture of claim 1, wherein the method steps comprise propagating the block map to one or more cache devices.

5. The article of manufacture of claim 4, wherein the one or more cache devices comprise an operating system page cache and/or a local disk cache.

6. The article of manufacture of claim 1, wherein the destination addresses in the block map are in the form of file blocks and include a file identifier and an offset.

7. The article of manufacture of claim 6, wherein the file identifier is a node number.

8. The article of manufacture of claim 1, wherein the method steps comprise managing the local disk cache via affording file blocks appearing in early positions in the cache higher priority to stay in the cache.

9. The article of manufacture of claim 1, wherein the method steps comprise providing run-time support by redirecting image accesses to different base images.

10. The article of manufacture of claim 1, wherein the method steps comprise expediting look-up operations via a binary search.

11. The article of manufacture of claim 1, wherein the method steps comprise expediting look-up operations via a bloom filter.

12. A system for de-duplicating virtual machine image accesses, comprising:
   at least one distinct software module, each distinct software module being embodied on a tangible computer-readable medium;
   a memory; and
   at least one processor coupled to the memory and operative for:
       identifying two or more blocks having identical content in two or more images in a virtual machine image repository;
       generating a block map for mapping the two or more blocks having identical content into a same block, wherein each entry in the block map points one of the two or more blocks to a destination address in a local disk cache associated with one or more blocks based on block content;
       deploying a virtual machine image by reconstituting an image from the block map and fetching any unique blocks remotely on-demand;
       de-duplicating virtual machine image accesses by storing the deployed virtual machine image in the local disk cache; and
       redirecting a read request for one of the two or more blocks to the corresponding destination address in a local disk cache based on the block map upon receiving the read request at a cache device.

13. The system of claim 12, wherein the destination addresses in the block map are in the form of file blocks and include a file identifier and an offset.

14. The system of claim 13, wherein the file identifier is a node number.

15. A distributed storage system, comprising:
   distinct software modules, wherein each distinct software module is embodied on a tangible computer-readable memory and executing on a hardware processor, the software modules comprising:
       a metadata module which identifies two or more blocks having identical content in two or more images in a virtual machine image repository and generates a block map for mapping the two or more blocks having identical content into a same block, wherein each entry in the block map points one of the two or more blocks to a destination address in a local disk cache associated with one or more blocks based on block content;
       an access mapping module which redirects virtual machine an image read request for one of the two or more blocks to the corresponding destination address in a local disk cache according to the block map upon receiving the read request at a cache device; and
       a local disk cache management module which fetches blocks remotely on-demand, and stores virtual machine images in a local disk cache.

16. A method for de-duplicating virtual machine image accesses, the method comprising:
   identifying two or more blocks having identical content in two or more images in a virtual machine image repository;
   generating a block map for mapping the two or more blocks having identical content into a same block, wherein each entry in the block map points one of the two or more blocks to a destination address in a local disk cache associated with one or more blocks based on block content;
   deploying a virtual machine image by reconstituting an image from the block map and fetching any unique blocks remotely on-demand;
   de-duplicating virtual machine image accesses by storing the deployed virtual machine image in the local disk cache; and
   redirecting a read request for one of the two or more blocks to the corresponding destination address in a local disk cache based on the block map upon receiving the read request at a cache device;

wherein said identifying, said generating, said deploying, said de-duplicating and said redirecting are carried out by a computer device.

17. The method of claim 16, comprising consolidating the block map by merging continuous blocks.

18. The method of claim 16, comprising providing runtime support by redirecting image accesses to different base images.

19. The method of claim 16, comprising propagating the block map to one or more cache devices.

20. The method of claim 16, comprising managing the local disk cache via affording file blocks appearing in early positions in the cache higher priority to stay in the cache.

* * * * *